(12) United States Patent
Bolnick

(10) Patent No.: US 6,307,547 B1
(45) Date of Patent: *Oct. 23, 2001

(54) METHOD AND SYSTEM FOR PROVIDING ENHANCED FOLDER RACKS

(75) Inventor: David A. Bolnick, Seattle, WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/531,152

(22) Filed: Sep. 18, 1995

(51) Int. Cl.[7] .................................................... G06F 7/00
(52) U.S. Cl. ............................ 345/351; 345/340; 345/348
(58) Field of Search ....................................... 395/348, 349, 395/350, 351, 352, 353, 334, 333, 356, 329, 331, 332; 345/331, 332, 333, 334, 329, 350, 351, 356, 348, 349

(56) References Cited

U.S. PATENT DOCUMENTS

| | | | |
|---|---|---|---|
| 4,601,003 | * 7/1986 | Yoneyama et al. | 395/351 |
| 4,885,704 | 12/1989 | Takagi et al. . | |
| 5,008,853 | * 4/1991 | Bly et al. | 345/329 |
| 5,060,135 | 10/1991 | Levine et al. . | |
| 5,072,412 | 12/1991 | Henderson, Jr. et al. . | |
| 5,140,677 | 8/1992 | Fleming et al. . | |
| 5,305,435 | * 4/1994 | Bronson | 395/351 |
| 5,345,550 | 9/1994 | Bloomfield . | |
| 5,347,628 | * 9/1994 | Brewer et al. | 395/351 |
| 5,384,911 | 1/1995 | Bloomfield . | |
| 5,461,710 | * 10/1995 | Bloomfield et al. | 345/349 |
| 5,550,968 | * 8/1996 | Miller et al. | 395/332 |
| 5,678,014 | * 10/1997 | Malamud et al. | 345/348 |

FOREIGN PATENT DOCUMENTS

WO 93/22738  11/1993  (WO) .............................. G06F/15/62

* cited by examiner

*Primary Examiner*—John Cabeca
*Assistant Examiner*—Cao H. Nguyen
(74) *Attorney, Agent, or Firm*—Christensen O'Connor Johnson Kindness PLLC

(57) ABSTRACT

Enhanced folder racks have a number of improved capabilities, including the ability to lock a folder rack to limit access to objects held therein. The enhanced folder racks are logically partitioned to a number of slots. Each slot may hold one or more objects that are not limited solely to documents. When a slot holding multiple objects is opened, windows for each of the objects held within the slot are opened in response. A user may assign labels for each of the slots in a folder rack, and the labels may be independent of the objects held within the slots. A user may choose to configure a folder rack in accordance with a predefined scheme. The system provides a number of predefined schemes that define how many slots are included in a folder rack and predefines the labels for the slots. Each folder rack may include an auxiliary menu that lists the labels of the slots held therein.

41 Claims, 9 Drawing Sheets

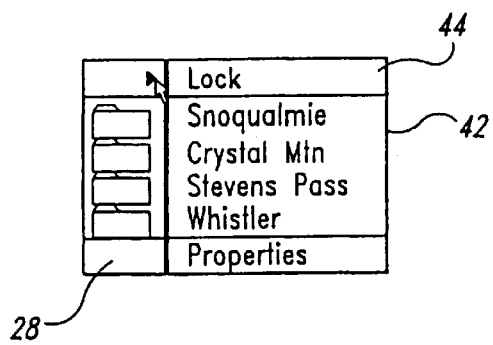
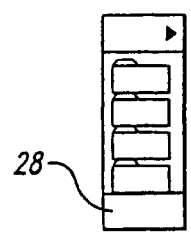
*Fig. 8A*  *Fig. 8B*
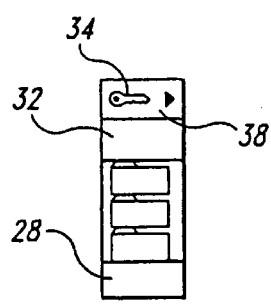
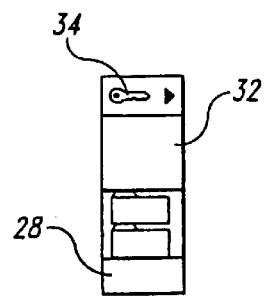
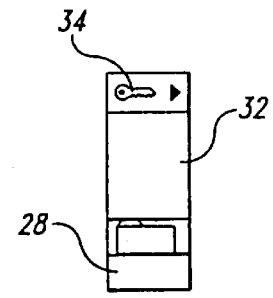
*Fig. 8C*  *Fig. 8D*  *Fig. 8E*
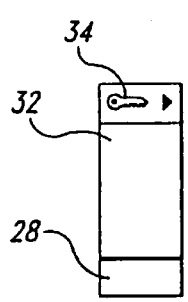
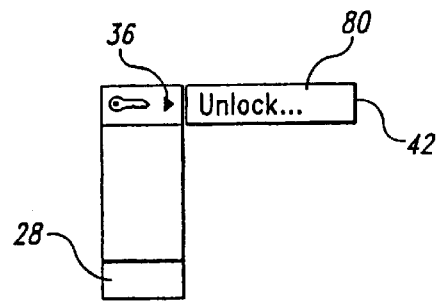
*Fig. 8F*  *Fig. 9*
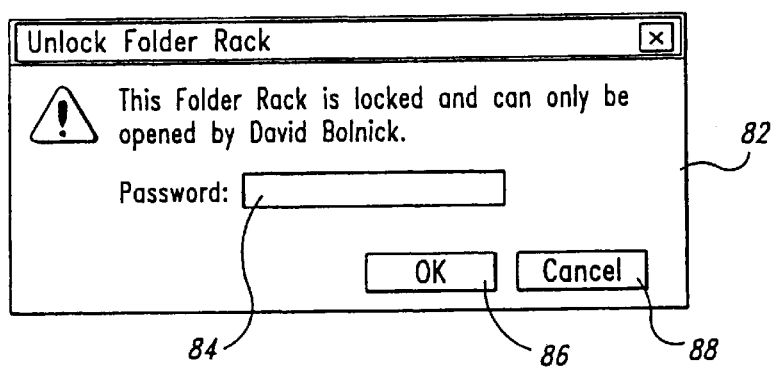
*Fig. 10*

METHOD AND SYSTEM FOR PROVIDING ENHANCED FOLDER RACKS

TECHNICAL FIELD

The present invention relates generally to computer systems and, more particularly, to the use of enhanced folder racks in computer systems.

BACKGROUND OF THE INVENTION

Copending U.S. patent application Ser. No. 08/204,529, entitled "Folder Rack Icons," which was filed on Mar. 1, 1994, describes a method and system for implementing folder rack icons. This copending patent application describes folder rack icons that each represent a number of logically grouped icons in a fashion that occupies less of the screen of a video display than the logically grouped icons would occupy if displayed separately. The icons that are grouped into the folder rack icon may be icons for folders, icons for documents, or other icons that are associated with objects. Two alternative folder rack icons are described within the copending application.

SUMMARY OF THE INVENTION

The present invention provides embellished folder racks that have additional capabilities (that will be described in more detail below) relative to the folder racks described within copending application Ser. No. 08/204,529. In accordance with a first aspect of the present invention, a method is practiced in a computer system such that an unlocked folder rack is provided for holding objects. The folder rack has a number of slots, wherein each slot may be empty such that it holds no objects, or full such that it holds at least one object. The folder rack is locked so that the folder rack and any of the objects held therein are not accessible through the folder rack.

In accordance with another aspect of the present invention, a method is practiced in a computer system that has a video display. Per the method, a folder rack with slots is provided. Each slot is adapted for holding one or more objects, and a selected slot holds multiple objects. Each object has an associated window. In a response to a request to open the selected slot, the associated windows for the objects held in the selected slot are opened on the video display.

In accordance with a further aspect of the present invention, a method is practiced in a computer system that has a video display and a file system for managing file system objects. Per this method, a folder rack object is provided for logically grouping file system objects. The folder rack object has slots wherein each slot may hold one or more of the file system objects. Each slot has a label that identifies the slot. A folder rack icon is displayed for the folder rack object on the video display. A menu that lists the labels for each of the slots of the folder rack object is also displayed on the video display.

In accordance with yet another aspect of the present invention, a method involves providing a file rack with slots for holding one or more objects. A user provided name is assigned to a selected one of the slots of the folder rack, and the user provided name is used to identify the selected slot.

In accordance with an additional aspect of the present invention, a method is practiced in a computer system that has a video display and an input device. Per this method, a folder rack icon is displayed on the video display. The folder rack has visual representation of a number of slots. At least one of the slots holds a visual representation of a template generator for generating a template, such as a template of a word processing document or spreadsheet program document. In response to a user using the input device (such as a mouse), it is determined which of the template generators the user has selected to generate a template. The template generator that has been selected by the user is then used to generate a template in a window on the video display.

In accordance with a further aspect of the present invention, a user is provided with a choice of a number of different predefined folder rack configurations that have a predefined number of slots for holding objects with predefined labels that identify the slots. A user choice of one of the predefined folder rack configurations is received, and an instance of a folder rack icon having the predefined folder rack configuration is created.

BRIEF DESCRIPTION OF THE DRAWINGS

A preferred embodiment of the present invention will be described below relative to the following drawings.

FIGS. 8A, 8B, 8C, 8D, 8E and 8F depict the changing appearance of a folder rack icon when an animation sequence is performed in response to locking a folder rack that is associated with the icon.

FIG. 9 depicts an example of the auxiliary menu when a folder rack is locked.

FIG. 10 depicts an example of a password dialog for unlocking a folder rack.

DETAILED DESCRIPTION OF THE INVENTION

The preferred embodiment of the present invention provides enhanced folder racks that have a number of improved capabilities. The enhanced folder racks may be locked so as to provide security of the contents held therein. While the folder rack is locked, objects held in the folder rack may not be accessed through the folder rack. The enhanced folder racks include slots that may hold multiple objects. When a slot holding multiple objects is opened, the windows for each of the objects held therein are opened in response. An auxiliary menu is provided to list the labels of the slots of the folder rack and to facilitate access to the objects stored in the slots. The user has the ability to assign the labels to the slots, and the assigned labels may differ from the contents stored within the slots. For user convenience, the system also provides predefined folder rack schemes that include a predefined number of slots having predefined labels. The system supports the creation of a special type of folder rack, known as a supply rack, that holds template generators in its slots. A user may use the supply rack to choose a template generator to generate a template, such as a word processing document or a spreadsheet program document.

Figure 1:
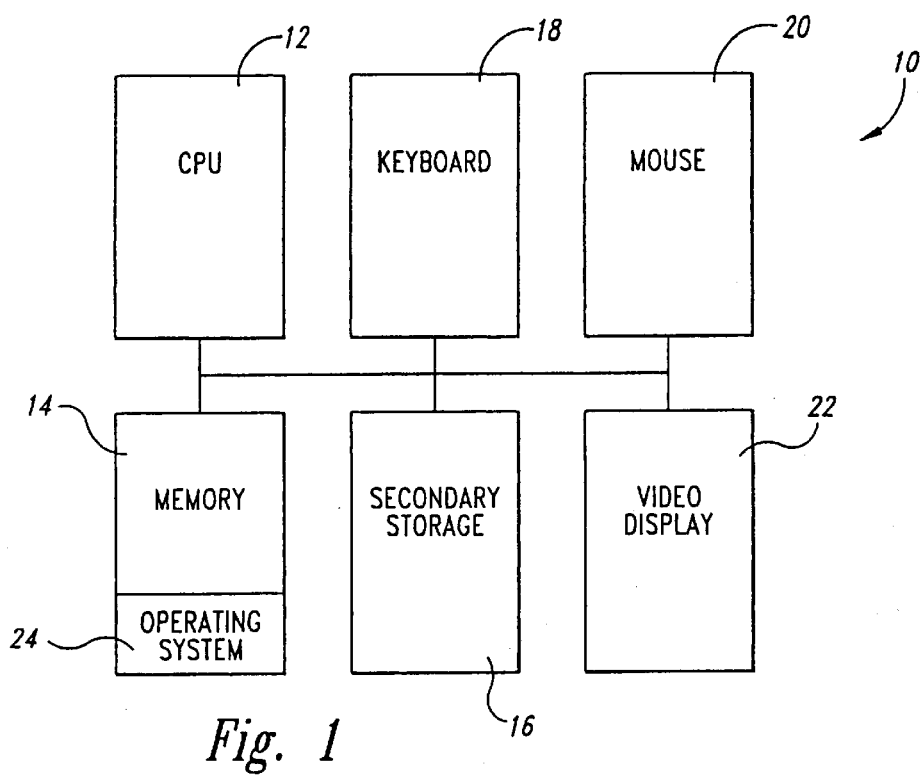
FIG. 1 is a block diagram of a computer system that is suitable for practicing the preferred embodiment of the present invention.

FIG. 1 is a block diagram of a computer system 10 that is suitable for practicing the preferred embodiment of the present invention. The computer system includes a central processing unit (CPU) 12 that has access to a primary memory 14 and a secondary storage 16. The secondary storage 16 may be any of a number of different conventional types of secondary storage devices, including a hard disk drive device. The primary memory 14 holds a copy of an operating system 24 and may hold application programs. In the preferred embodiment of the present invention, the software for implementing the preferred embodiment is contained within the operating system 24. The operating system 24 includes a file system that facilitates the use of file system objects, including documents and folders. In this context a "folder" is a container for logically grouping documents and files.

The computer system 10 also may include a number of different peripheral devices. For example, FIG. 1 depicts a keyboard 18 and a mouse 20 as part of the computer system 10. Those skilled in the art will appreciate that the present invention may also include other input devices such as pointing devices and audio input devices. The computer system 10 additionally includes a video display 22 that is used to display video images. As will be described in more detail below, the operating system 24 uses the video display 22 to display folder rack icons.

A folder rack is implemented by the file system of the operating system 24 as a special type of folder. Each folder rack has a designated number of slots in which one or more objects may be held. These objects may be documents, folders, template generators, or other types of objects. Each slot has a label associated with it that is used for identifying the slot. As will be described in more detail below, the label assigned to a slot may be independent of the objects held within the slot. Each slot within a folder rack may be empty (i.e., holding no objects) or full (i.e., holding one or more objects). Each folder rack has an associated folder rack icon that may be displayed on the video display 22. The appearance of the folder rack icon varies with state of the folder rack.

A folder rack may be in one of two states: the locked state or the unlocked state. The locked state provides a degree of security for the folder rack and the objects held in the slots of the folder rack. A user may not access the slots or objects held therein when the folder rack is locked. When, in contrast, a folder rack is unlocked, the slots and objects held therein may be freely accessed by parties with the sufficient access rights.

Figure 2:
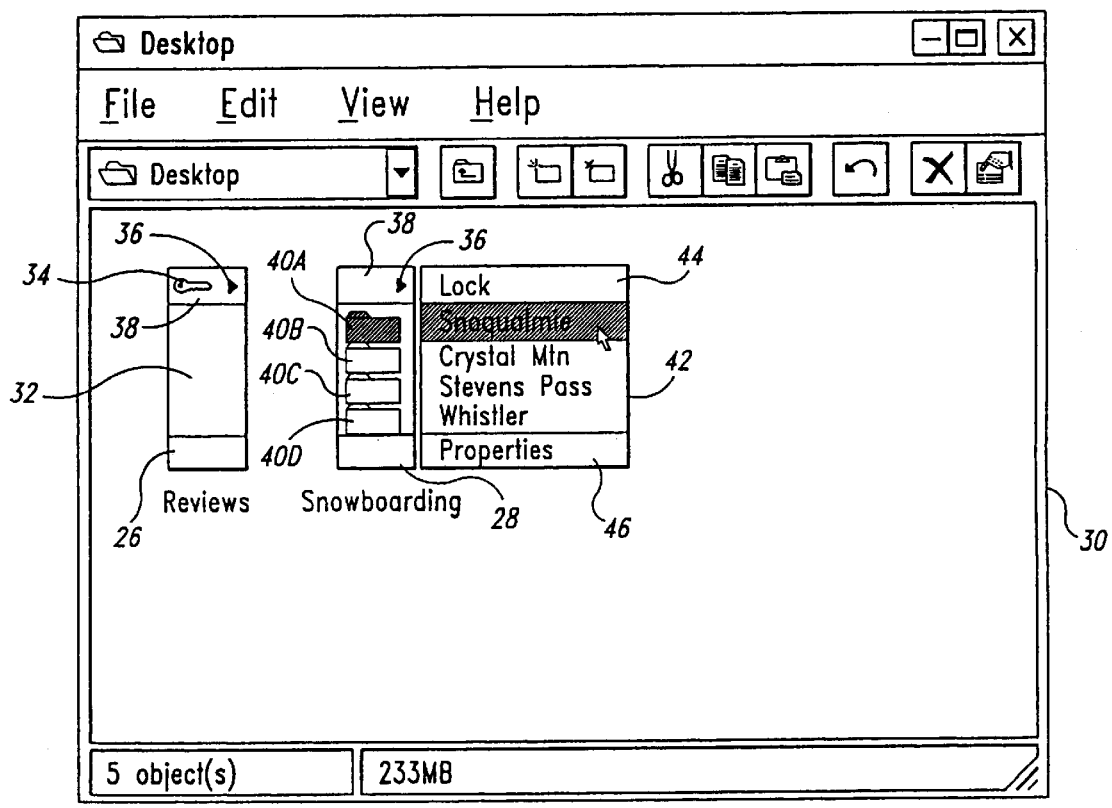
FIG. 2 depicts a folder rack icon in the locked state and a folder rack icon in the unlocked state in accordance with the preferred embodiment of the present invention.

FIG. 2 shows an example of a folder rack icon 26 in the locked state for a folder rack that is named "Reviews." In this example, the folder rack holds documents for personnel evaluation reviews. As such, it is desirable to provide security over the review documents and thus, the folder rack is locked. In the locked state, the folder rack icon 26 has a cover 32 that visually obscures the slots and objects held within the folder rack. In addition, a locked state icon 34 provides a visual cue to a user that the folder rack is locked. A menu marker 36 is provided to gain access to an auxiliary menu (which will be described in more detail below). The locked state icon 34 and the menu marker 36 are located on the control bar 38 of the folder rack icon 26.

Figure 3:
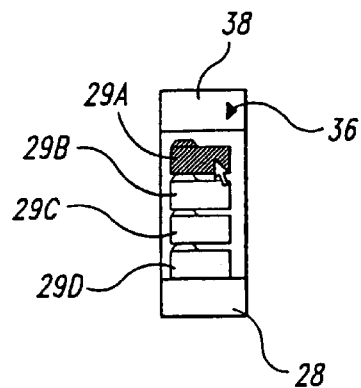
FIG. 3 depicts an example of a folder rack icon in the unlocked state that has empty slots.

FIG. 2 also depicts a folder rack icon 28 for the folder rack named "Snowboarding" in the unlocked state with the corresponding auxiliary menu 42 fully displayed. In the unlocked state, the folder rack icon 28 does not include a locked state icon 34 in the control bar 38. The menu marker 36, however, is still displayed on the control bar 38. The menu marker 36 may be utilized to cause the auxiliary menu 42 to be displayed. In the example given in FIG. 2, the folder rack icon includes four slots 40A, 40B, 40C and 40D that are all full. The slots are organizational tools and in this example, may be used to hold objects having information regarding different snowboarding sites. Nevertheless, it should be appreciated that the folder rack icon 28 in the unlocked state may also display empty slots, such as slots 29B, 29C and 29D shown in FIG. 3. Slot 29A, however, is full. It should be noted that full implies that the slot holds at least one object and not that the slot is at capacity. A visual indicator in the form of a folder, specifies that a slot is full. The absence of a folder indicates that the slot is not full.

The auxiliary menu 42 provides a separate entry for each of the slots when the folder rack is unlocked. In the example shown in FIG. 2, the auxiliary menu 42 includes the menu entries "Snoqualmie," "Crystal Mtn.," "Stevens Pass," and "Whistler." As will be described in more detail below, these menu items may be utilized to gain access to the associated slots. As will also be explained below, the labels for the slots may be assigned by the user, assigned default values or selected from predefined schemes. The auxiliary menu 42 also includes an entry 44 for toggling the state of the folder rack to the locked state. Lastly, the auxiliary menu 42 holds an entry 46 to access property sheets for the folder rack when the folder rack is in the unlocked state.

In the preferred embodiment of the present invention, each folder rack is implemented as a object. Those skilled in the art, however, will appreciate that the present invention may also be practiced in non-object oriented environments. The folder rack object has a locked state view and an unlocked state view associated with it. The view that is displayed on the video display 22 depends upon the current state of the folder rack. The appearance of the auxiliary menu 42 also depends upon the state of the folder rack.

Figure 4A:
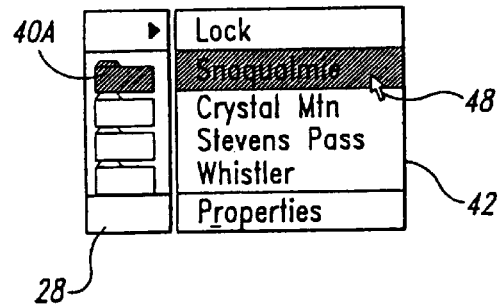
FIGS. 4A, 4B and 4C illustrate different techniques for opening a slot in a folder rack.

A user has a number of different ways of opening a slot in a folder rack to view the contents held in the slot. FIG. 4A shows an example of one method of opening a slot of a folder rack. In particular, a user may open a slot of a folder rack by positioning a mouse cursor 48 to point to the menu item in auxiliary menu 42 for a slot and releasing a designated mouse button (e.g., the left mouse button) to select the menu item.

Figure 4B:
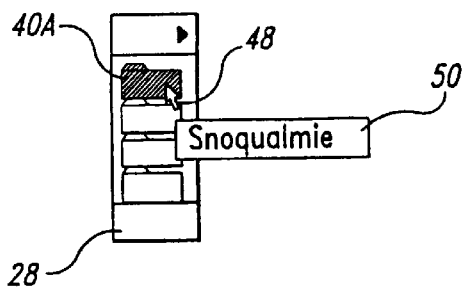

Another alternative for opening a slot is to position the mouse cursor 48 to point at the visual representation of the slot 40A (FIG. 4B) and then double click a designated mouse button. In the preferred embodiment of the present invention, each visual representation of a slot is implemented in the icon as a child window control. As such, each slot has its own window that receives mouse messages that indicate that the cursor is positioned in the child window and that indicate when the mouse button has been clicked.

Figure 4C:
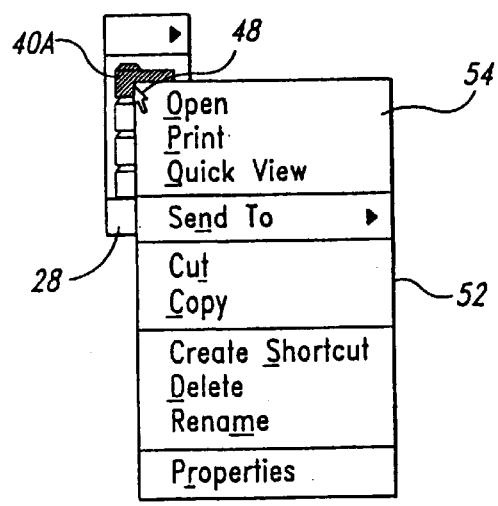

FIG. 4C depicts a third option for opening a slot. Each full slot has a context menu associated with it. The context menu may be brought up by positioning the mouse cursor 48 to point at the visual representation of the slot 40A and then clicking a designated one of the mouse buttons 20 (e.g., the right mouse button). The context menu 52 includes an "Open" option 54 for opening the slot.

Figure 5:
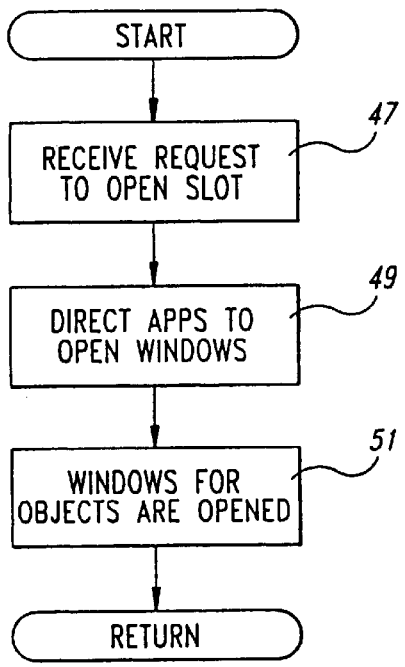
FIG. 5 is a flowchart that illustrates the steps that are performed in opening a slot of a folder rack.

FIG. 5 is a flowchart that illustrates the steps that are performed in opening a slot. Initially a request is received to open the slot (step 47). Any of the three above described methods may serve as the source of such a request. The application programs associated with the objects held within the slot are then directed to open windows for the objects (step 49). As a result, the windows for the objects are opened (step 51). The preferred embodiment of the present invention allows multiple objects to be held within a single slot. Hence, opening a slot may cause multiple windows to be simultaneously opened together. This capability can be useful in organizing related documents into a single slot so that their windows are opened together.

A folder rack icon may be selected by positioning a mouse cursor to point at any of its gray area (i.e., any area that is not a slot and not part of the control bar) and clicking a button on a mouse 20. The folder rack has an associated context menu that may be displayed. In addition, a folder rack may be dragged and dropped using the mouse 20 or other suitable input device.

Figure 6A:
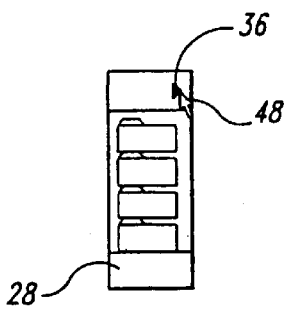
FIGS. 6A, 6B, 6C, 6D, 6E and 6F depict respective frames of an animation that is performed to display an auxiliary menu for an unlocked folder rack.

As was mentioned above, the menu marker 36 may be utilized to prompt the display of the auxiliary menu 42. Specifically, for an unlocked folder rack, the menu marker 36 may be used as shown in FIG. 6A to prompt the display of the auxiliary menu 42. The menu marker 36 has a designated hot region in the control bar that causes the auxiliary menu 42 to be displayed when the mouse cursor 48 points within the designated hot region. The auxiliary menu 42 is displayed as an animation, as will be described below.

Figure 6B:
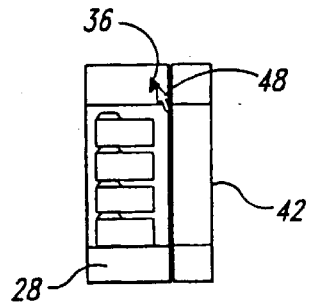
Figure 6C:
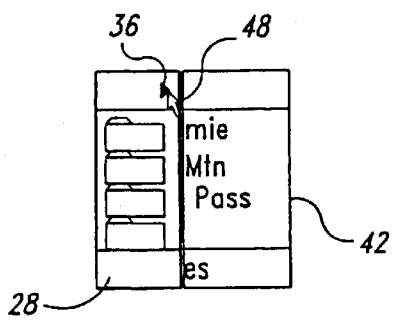
Figure 6D:
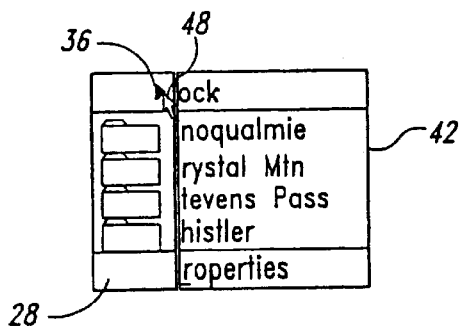
Figure 6E:
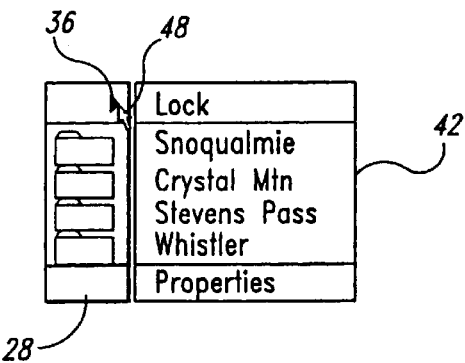
Figure 6F:
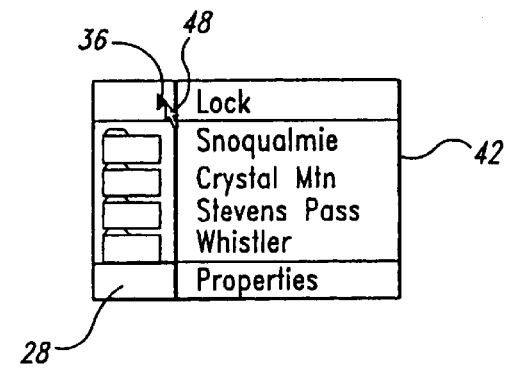

FIG. 6A shows the appearance of a folder rack icon 28 in the unlocked state with the mouse cursor 48 pointing at menu marker 36. This activity triggers the activation of the animation of the auxiliary menu 42. FIG. 6B shows the appearance of the animation after 10 milliseconds, and FIG. 6C depicts the state of the animation after 150 milliseconds. After 250 milliseconds, the animation appears as shown in FIG. 6D. By 500 milliseconds the entire auxiliary menu 42 is displayed as shown in FIG. 6E. At the expiration of 750 milliseconds, the animation is complete by the auxiliary menu 42 being drawn with an elevated three dimensional appearance (FIG. 6F) rather than with a flat appearance as shown in FIG. 6E.

Figure 7:
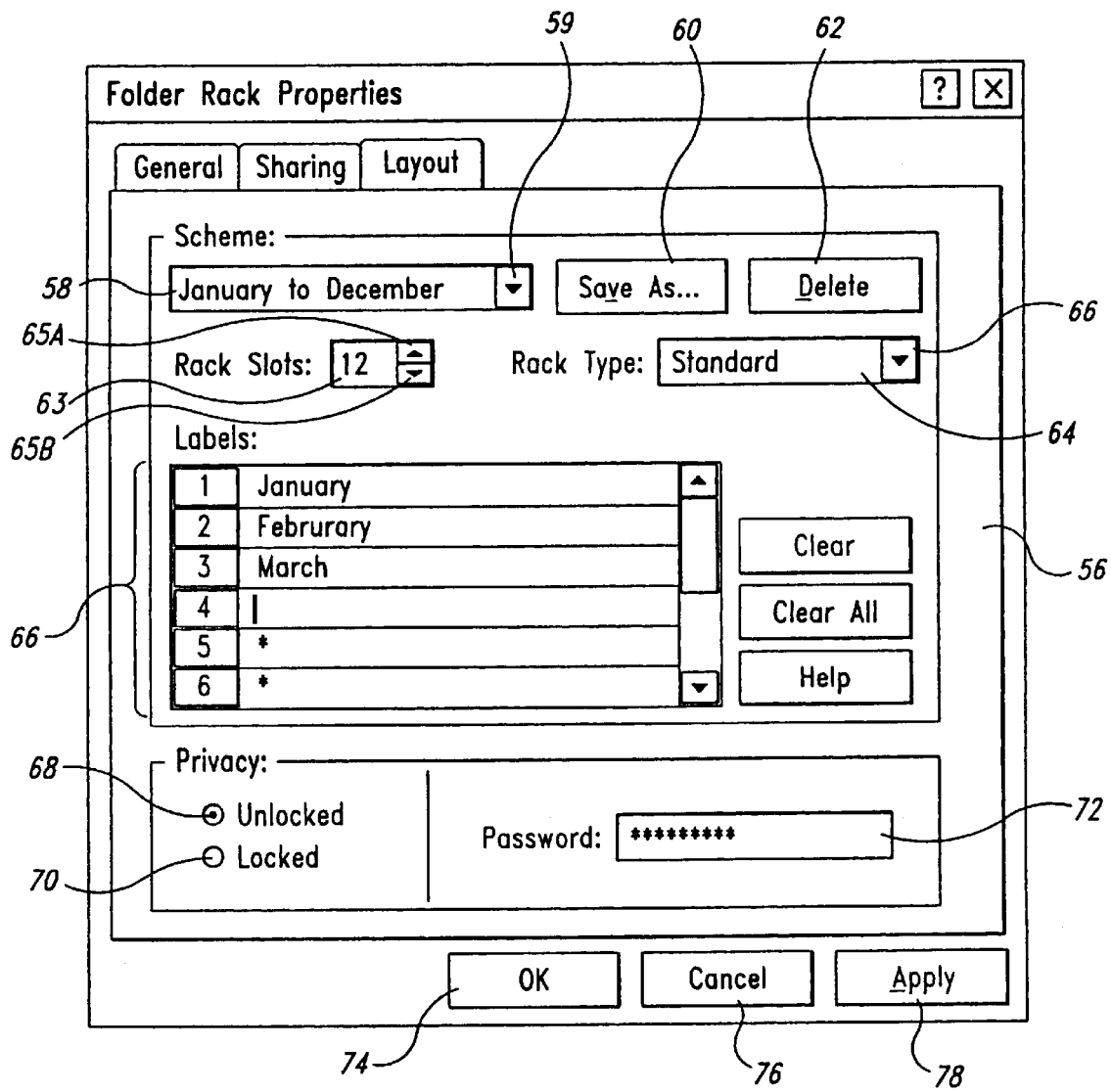
FIG. 7 depicts an example of a layout property sheet for a folder rack.

When the folder rack is in the unlocked state, the auxiliary menu 42 includes a menu item 46 for displaying a property sheet for the folder rack. FIG. 7 depicts an example of a "Layout" property sheet 56 for a folder rack. The property sheet 56 allows a user to set and adjust the properties of the folder rack. The preferred embodiment of the present invention allows a user to choose a predefined folder rack configuration for a folder rack. These predefined configurations are known as "schemes" and designate the number of slots and the labels for the slots in the folder rack. The property sheet 56 includes a drop down list box 58 that lists the predefined schemes that the system has stored. The entire list may be displayed by clicking on button 59 of the drop down list box 58. The user can then select from among the listed schemes. A user also has the option of defining a scheme. To define a scheme, a user sets properties for the folder rack using the property sheet 56 and then activates the "Save As" button 60. The user may delete existing predefined schemes by selecting the scheme in the drop down list box 58 and depressing the "Delete" button 62.

A user may select the number of slots in a rack by using the dialog 63. The user may edit the value displayed within the dialog 63 or use the increment button 65A or the decrement button 65B to select an appropriate value. The property sheets 56 allow the user to choose the type of folder rack. Folder racks come in two varieties: standard and supply rack. A drop down list 64 lists these two options. The user may choose which option is appropriate. The property sheet 56 allows a user to edit and create labels for the slots in the folder rack. A dialog 66 is provided to enable the user to edit and insert text for the labels. The property sheet 56 may be used to set the state of a folder rack. Specifically, an option 68 is provided to place the folder rack in the unlocked state, and an option 70 is provided to place the folder rack in the locked state. The password that a user must enter to unlock a folder rack may also be created and edited using text box 72.

When a user has completed setting the properties, the user depresses the "OK" button 74 to have the properties adopted as set and to close the property sheet 56. To have the properties changed immediately without closing the property sheet 56, the user depresses the "Apply" button 78. A user may also cancel the changes that the user has made to the properties by pressing a "Cancel" button 76.

The property sheet 56 is defined on a per object class basis. In the preferred embodiment of the present invention, a folder rack is an instance of a folder rack object type. A property sheet handler for generating a "Layout" property sheet 56 is defined for the object class. This property sheet handler is invoked to display the property sheet 56 in response to the user selecting menu option 46 on the auxiliary menu 42.

The auxiliary menu 42 (FIG. 8A) includes an entry 44 for locking the folder rack when in the unlocked state. FIGS. 8A–8F depict various phases of what occurs when a user wishes to toggle the state of a folder rack to the locked state. Initially, as shown in FIG. 8A, the auxiliary menu 42 is displayed with the lock entry 44. When the user selects the lock entry, the auxiliary menu 42 disappears as shown in FIG. 8B. An animation is then initiated. The animation causes a cover 32, as shown in FIG. 8C, to slide down over the slots of the folder rack. When the animation is initiated, the locked state icon 34 is displayed on the control bar 38. As the animation continues, the cover 32 slides down to cover progressively greater portions of the folder rack as depicted in FIGS. 8D and 8E. When the animation is complete, the cover 32 obscures all of the slots of the folder rack as shown in FIG. 8F.

One of the consequences of the folder rack being locked is that the auxiliary menu 42 changes. As shown in FIG. 9, when the folder rack is in the locked state, only a single menu option 80 is displayed on the auxiliary menu 42. This single menu option 80 is the option to unlock the folder rack. When a user selects the unlock menu option 80, a dialog box 82, like that depicted in FIG. 10, is displayed. The dialog box includes a text box 84 in which a user is prompted to enter the correct password for unlocking the folder rack. The dialog box 82 also includes an "OK" button 86 that a user may depress to have the password processed or a "Cancel" button 88 that a user may depress to halt the effort to unlock the folder rack. If a user successfully enters the proper password in the text box 84, the folder rack is unlocked. The animation of FIGS. 8A–8F is repeated in a backwards sequence. Furthermore, the auxiliary menu is changed to be appropriate for the unlocked state.

Figure 11A:
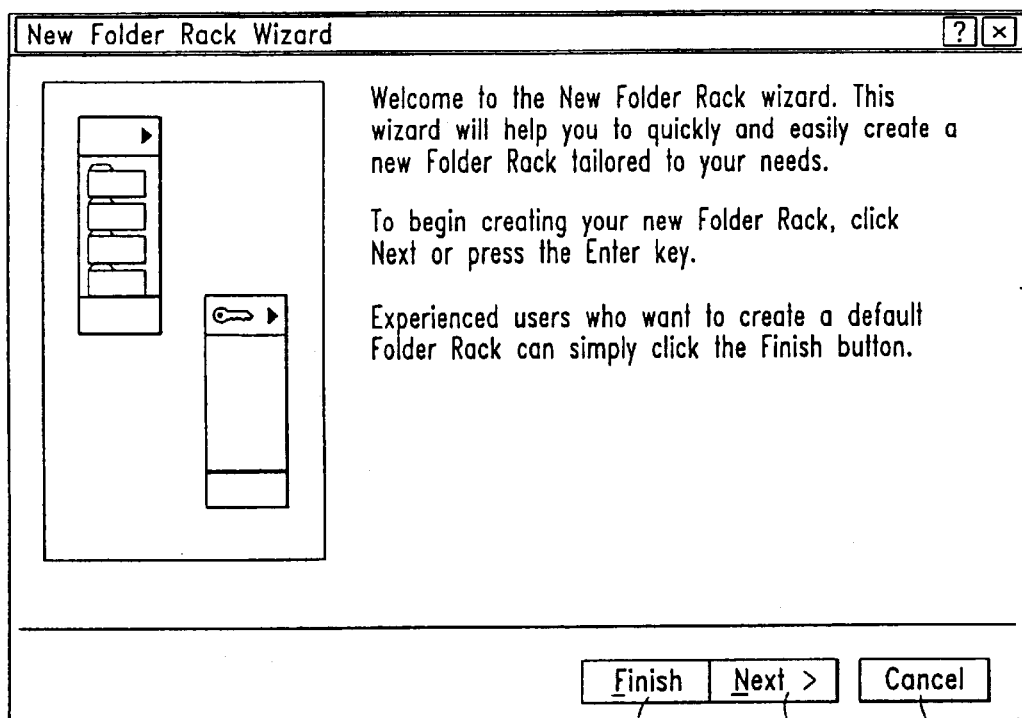
FIGS. 11A, 11B, 11C, 11D, 11E, and 11F depict respective frames of a folder rack wizard that is provided by the preferred embodiment of the present invention.
Figure 11B:
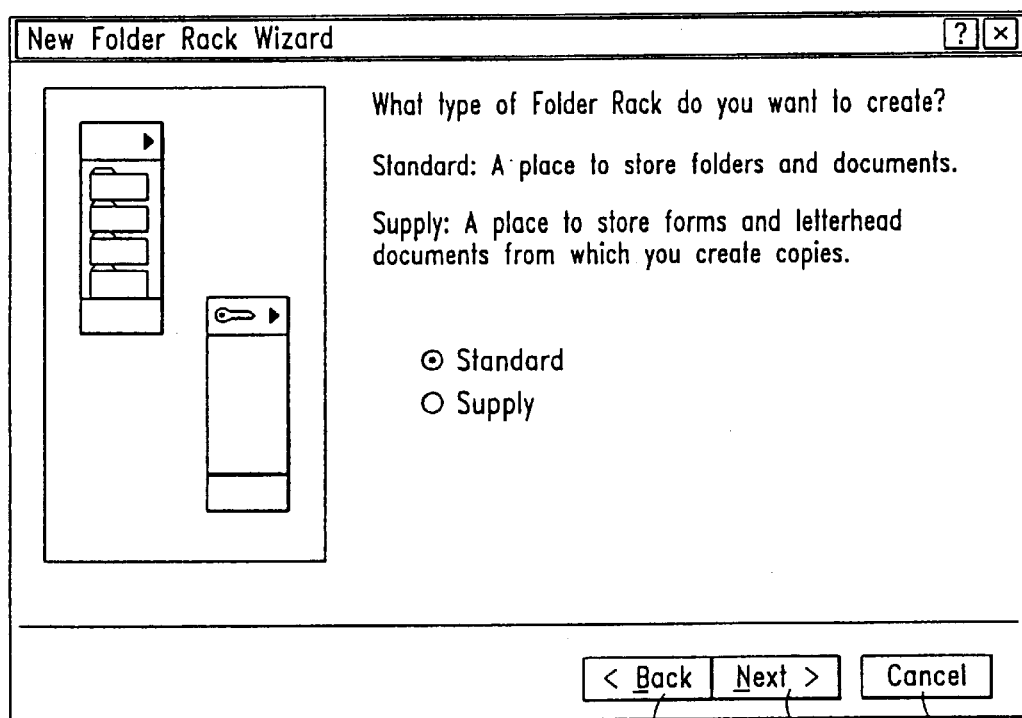

In the preferred embodiment of the present invention, a wizard is provided to enable a user to create a new folder rack. The wizard includes a sequence of frames that guide the user in creating the new folder rack. FIG. 11A shows the initial frame of the folder rack wizard sequence. The initial frame 90 provides the users with an introduction and includes a number of buttons. A "Finish" button 92 is provided to allow the user to finish the wizard sequence. A "Next" button 94 is provided to allow a user to view the next frame of the folder rack wizard. A "Cancel" button 96 is provided to allow the user to exit the folder rack wizard sequence. FIG. 11B depicts the next frame 98 of the folder rack wizard sequence. This frame asks the user to designate whether the folder rack is to be a standard folder rack or a supply folder rack. Supply folder racks will be described in more detail below. Frame 98 includes buttons similar to the initial frame except that a "Back" button 99 is provided rather than the "Finish" button 92. The "Back" button 99 allows a user to again display the immediately previous frame of the folder rack wizard.

Figure 11C:
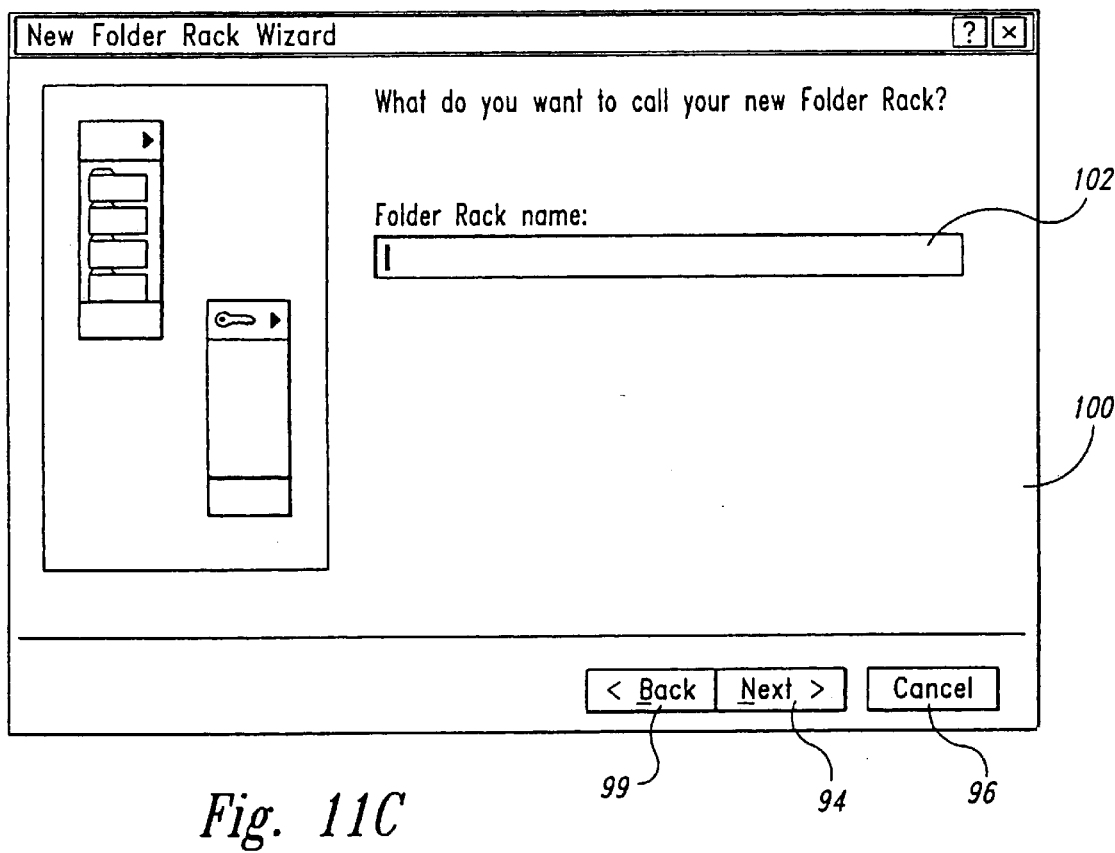
Figure 11D:
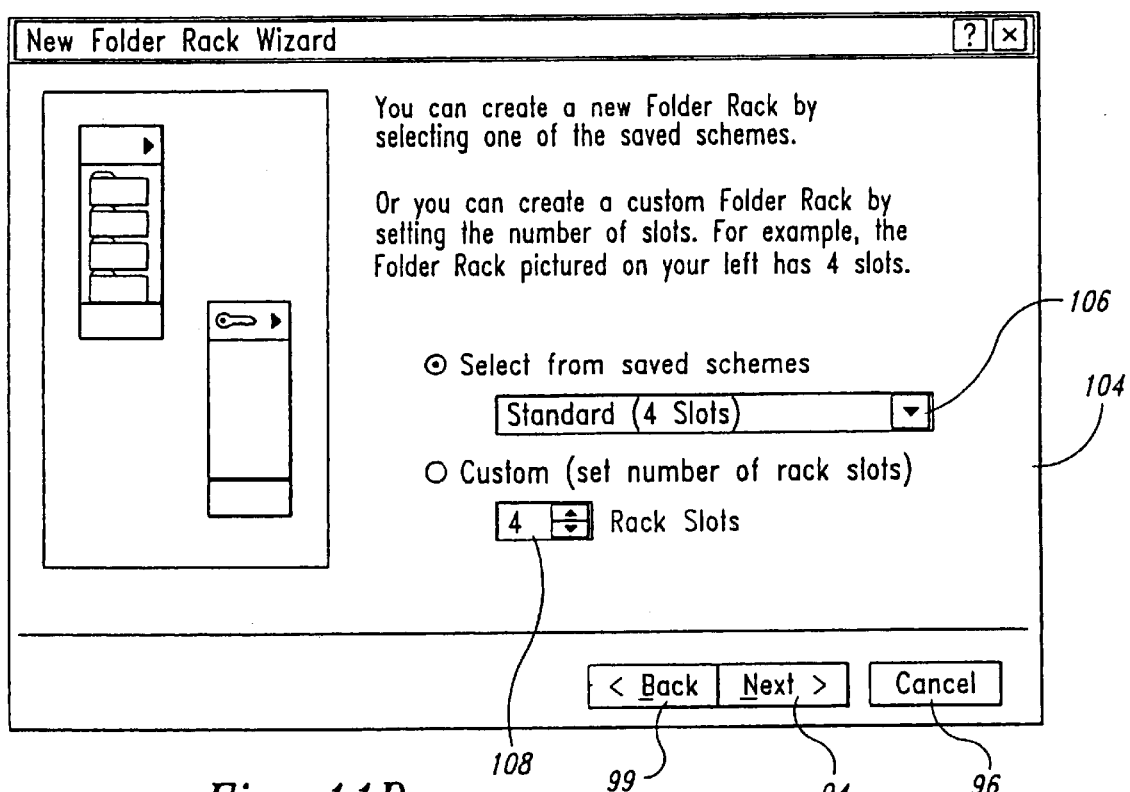

FIG. 11C shows the next frame 100 of the folder rack wizard. Frame 100 asks the user to enter the name for the folder rack in a text box 102. Frame 100 is followed by frame 104, which asks the user to establish the number of slots in the folder rack. The user has the option of selecting from a predefined scheme having a predefined number of slots or of establishing the number of rack slots independently. A drop down list box 106 lists the schemes that are available. A dialog box 108 provides the user with the ability to set the number of slots.

Figure 11E:
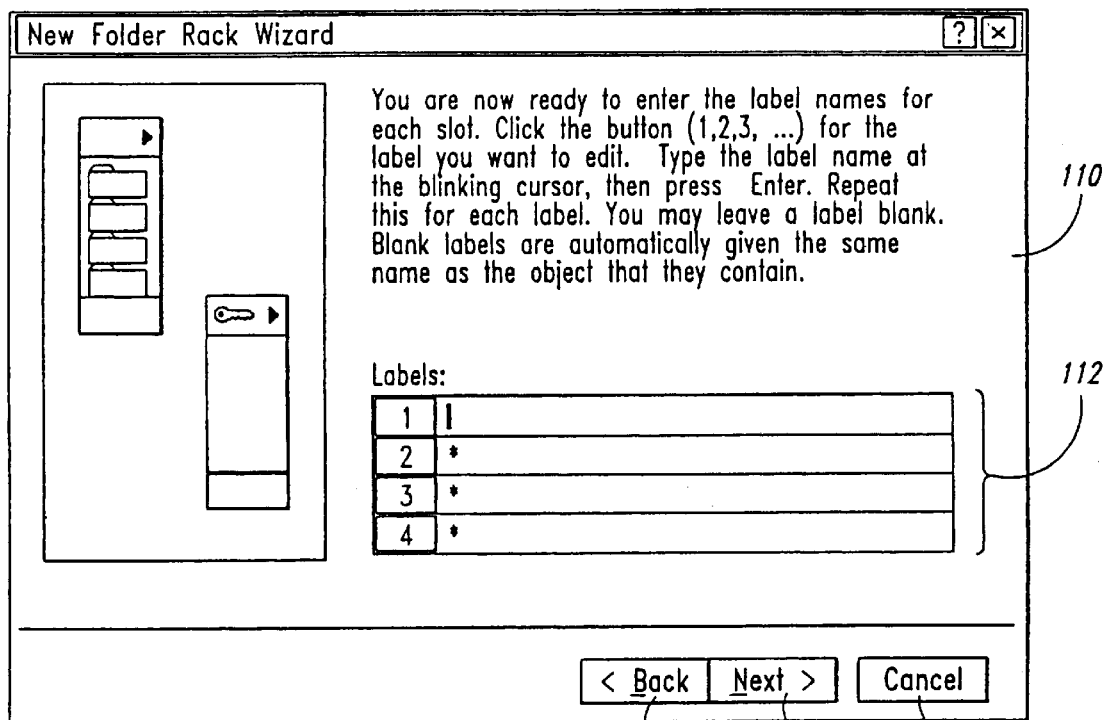
Figure 11F:
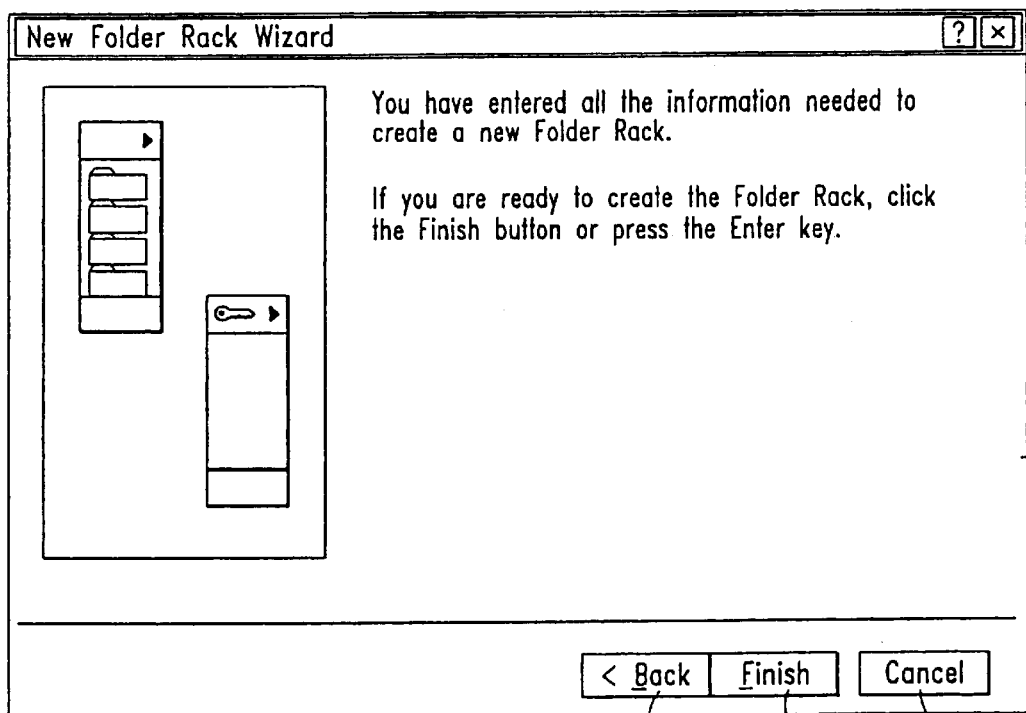

FIG. 11E shows the next successive frame 110 of the folder rack wizard sequence. Frame 110 provides the user with text boxes 112 for assigning labels for each of the slots. Lastly, frame 114 (FIG. 11F) is displayed to inform the user that the wizard is complete. A "Finish" button 116 replaces the "Next" button 94 in frame 114.

Figure 12A:
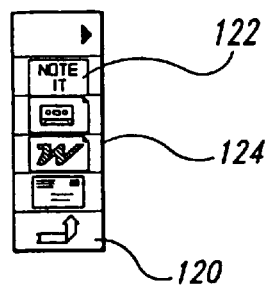
FIG. 12A depicts example of appearance of an icon for a supply rack in accordance with the preferred embodiment of the present invention.

A folder rack may be defined as a supply rack. A supply rack is intended to be analogous to the physical allegory of a rack that holds supplies, such as pens, paper clips and the like. In a supply rack, each slot that is full holds a template generator that is useful for generating a template of a document or other object. The appearance of a folder rack icon that is a supply rack differs from a folder rack icon. FIG. 12A shows an example of a folder rack icon 120 that is a supply rack. An icon, identifying the nature of the template that can be generated by selecting a slot, is depicted within the selected slots folder rack. For example, an icon 122 is provided for a note-it pad that generates notes that may be secured to various locations on a virtual desktop or in documents. An icon 124 is provided for a template generator that generates a template of a word processing document. Each icon is displayed in a control that causes the application that is associated with the icon to create the corresponding template when selected.

Figure 12B:
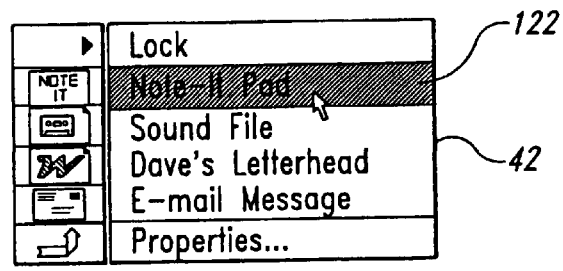
FIG. 12B illustrates an example of an auxiliary menu for the supply rack of FIG. 12A.
Figure 12C:
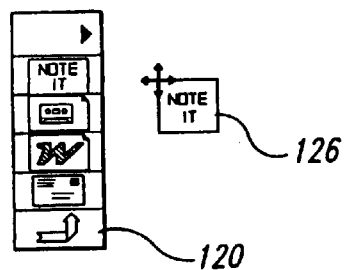
FIG. 12C illustrates an example of the creation of a note-it using the supply rack of FIG. 12A.

The supply rack may be utilized in different fashions. Suppose that a user wishes to create an instance of a note using the note-it pad. One option is for the user to drag and drop the icon 122 that is held in the first slot of the supply rack icon 120. Another option is for the user to display the auxiliary menu 42 and select option 122 for the note-it pad as shown in FIG. 12B. If the user were to use either of the options, a note 126 as shown in FIG. 12C is created.

While the present invention has been described with reference to a preferred embodiment thereof, those skilled in the art will appreciate that various changes in form and detail may be made without departing from the intended scope of the present invention as defined in the appended claims.

I claim:

1. In a computer system, a method for grouping a plurality of icons to occupy less area in a display space than a separate display for each grouped icon, each grouped icon being associated with an object, comprising:

(a) providing a folder rack having at least one slot, each slot providing an indication when it contains no objects and providing another indication when it contains one or more objects;

(b) associating the folder rack with a folder rack icon, the folder rack icon including a visual element for each slot in the folder rack, the display of the folder rack icon occupying less area in the display space than a separate display of an icon for each object contained in each slot of the folder rack; and (c) enabling the folder rack to be persistently locked as a unit so that all of the objects contained in each slot of the folder rack are inaccessible through the folder rack icon until the folder rack is unlocked.

2. The method of claim 1, further comprises changing the display of the folder rack icon to indicate when the folder rack is locked.

3. The method of claim 2, wherein changing the display of the folder rack icon to indicate that the folder rack is locked comprises displaying a cover on the folder rack icon that covers the objects contained in at least one slot in the folder rack.

4. The method of claim 3, wherein changing the display of the folder rack icon to indicate that the folder rack is locked comprises displaying an animation in which the folder rack icon is at least partially covered by the cover.

5. The method of claim 2, wherein changing the display of the folder rack icon to indicate that the folder rack is locked comprises displaying a lock icon with the folder rack icon.

6. The method of claim 1, wherein locking the folder rack is performed in response to a request by a user.

7. The method of claim 1, further comprising unlocking the folder rack to make all of the objects contained therein accessible through the folder rack icon to a user.

8. The method of claim 7, further comprising requiring the user to provide a correct password before unlocking the folder rack.

9. The method of claim 1, further comprising a labeling facility for labeling the slots in the supply rack with a name.

10. In a computer system, a method for grouping a plurality of icons to occupy less area in a display space than a separate display for each grouped icon, each grouped icon being associated with an object, comprising:

(a) providing a folder rack with at least one slot, each slot being able to contain one or more objects and being associated with a window;

(b) associating the folder rack with a folder rack icon, the folder rack icon including a visual element for each slot in the folder rack, the folder rack icon being displayed in a fashion that occupies less area in the display space than a separate display for each icon associated with at least one object in each slot of the folder rack;

(c) enabling a label to be created for each slot of the folder rack, each label being associated with a separate slot in the folder rack;

(d) displaying the folder rack icon associated with the folder rack, the folder rack icon having an auxiliary menu with an associated menu item for each label associated with a slot; and (e) in response to the selection of the associated menu item from the auxiliary menu for a label associated with a selected slot, opening the associated window for each object held in the selected slot in the display space.

11. The method of claim 10, wherein one of the objects held in the selected slot is a word processing object.

12. The method of claim 10, wherein one of the objects held in the selected slot is a folder object.

13. The method of claim 10, wherein one of the objects held in the selected slot is a spreadsheet program object.

14. In a computer system, a method for grouping a plurality of icons to occupy less area in a display space than a separate display for each grouped icons each grouped icon being associated with an object, comprising:

(a) displaying a supply rack icon associated with a supply rack, said supply rack icon having a visual representation of at least one slot in the supply rack, each slot being able to contain a visual representation of one or more template generators, and being associated with a window, each template generator being employed to generate a new instance of an object from a template associated with a visual representation of the template generator, the supply rack icon being displayed in a fashion that occupies less area in the display space than a separate display of an icon for each template generator;

(b) in response to selecting the visual representation of the template generator, determining the template generator associated with the visual representation of the template generator;

(c) invoking the determined template generator to generate a new instance of the object from the template in a separate window when the visual representation of the template generator is selected;

(d) enabling a label to be created for each slot of the supply rack, each label being associated with a separate slot in the supply rack;

(e) displaying the supply rack icon associated with the supply rack, the supply rack icon having, an auxiliary menu within associated menu item for each label associated with a slot; and (f) in response to the selection of the associated menu item from the auxiliary menu for a label associated with a selected slot opening the associated window for each object held in the selected slot in the display space.

15. The method of claim 14, wherein selecting the visual representation of the template generator comprises selecting the visual representation of the template venerator with an input device including a mouse.

16. The method of claim 14, wherein selecting the visual representation of the template generator comprises dragging the visual representation of the template generator to a position in the display space and dropping the visual representation at the position in the display space.

17. The method of claim 14, wherein the supply rack icon contains a word-processing template generator for generating a new instance of a word-processing object.

18. The method of claim 14, wherein the supply rack icon contains a spreadsheet template generator for generating a new instance of a spreadsheet object.

19. The method of claim 14, wherein the supply rack icon contains a note template generator for generating, a new instance of a note object.

20. The method of claim 14, wherein the supply rack icon contains a mail message template generator for generating a new instance of a mail message object.

21. The method of claim 14, further comprising:

enabling the supply rack to be persistently locked as a unit so that all of the objects contained in each slot of the supply rack are inaccessible through the supply rack icon until the supply rack is unlocked.

22. In a computer system, a method for grouping a plurality of icons to occupy less area in a display space than a separate display for each grouped icon, each grouped icon being associated with an object, comprising:

(a) providing a predefined folder rack configuration template, said predefined folder rack configuration template having at least one predefined slot that is able to contain one or more objects and enabling a predefined label to be separately associated with each predefined slot;

(b) associating said predefined folder rack configuration template with a predefined folder rack icon, the predefined folder rack icon including a visual element for each slot in the predefined folder rack configuration template, the predefined folder rack icon being displayed in a fashion that occupies less area in the display space than a separate display of an icon for each slot in the predefined folder rack configuration template;

(c) when said predefined folder rack configuration template is selected, creating a new instance of a predefined folder rack based on the selection of the predefined folder rack configuration template; ad (d) enabling said predefined folder rack to be persistently locked as a unit so that all of the objects contained in each slot of the predefined folder rack are inaccessible through the predefined folder rack icon until the predefined folder rack is unlocked.

23. The method of claim 22, further comprising storing each folder rack configuration template that is configured as a predefined folder rack configuration template.

24. The method of claim 22, further comprising:

a labeling facility for labeling the slots in the folder rack with a name.

25. A computer-readable medium holding computer-executable instructions for performing a method for grouping a plurality of icons to occupy less area in a display space than a separate display for each grouped icon, each grouped icon being associated with an object, comprising:

(a) providing a folder rack having at least one slot, each slot providing an indication when it contains no objects and another indication when it contains one or more objects;

(b) displaying a folder rack icon for the folder rack; and (c) enabling the folder rack to be persistently locked as a unit so that all of the objects contained in each slot of the folder rack are inaccessible through the folder rack icon until the folder rack is unlocked.

26. The computer-readable medium of claim 25, wherein the method further comprises:

in response to locking the folder rack, changing the folder rack icon to indicate that the folder rack is locked.

27. The computer-readable medium of claim 26, wherein changing the folder rack icon to indicate that the folder rack is locked comprises displaying a cover on the folder rack icon that covers at least a portion of the objects contained in the folder rack.

28. The computer-readable medium of claim 26, wherein changing the display of the folder rack icon to indicate that the folder rack is locked comprises displaying an animation in which the folder rack icon is at least partially covered by the cover.

29. The computer-readable medium of claim 26, wherein changing the folder rack icon to indicate that the folder rack is locked comprises displaying a lock icon with the folder rack icon.

30. The computer-readable medium of claim 25, wherein locking the folder rack is performed in response to a request.

31. The computer-readable medium of claim 25, further comprising unlocking the folder rack to make all of the objects contained therein accessible through the folder rack.

32. The computer-readable medium of claim 31, further comprising requiring a password to be provided before unlocking the folder rack.

33. A computer-readable medium holding computer-executable instructions for performing a method for grouping a plurality of icons to occupy less area in a display space than a separate display for each grouped icon, each grouped icon being associated with an object, comprising:

(a) providing a folder rack with at least one slot for containing one or more objects and each object is associated with a window;

(b) associating the folder rack with a folder rack icon, the folder rack icon including a visual element for each slot in the folder rack, at least one slot being able to contain one or more objects, the folder rack icon being displayed in a fashion that occupies less area in the display space than a separate display of an icon for at least one object contained in each slot of the folder rack;

(c) generating a label for each slot in the folder rack, each label being associated with a separate slot in the folder rack;

(d) displaying the folder rack icon associated with the folder rack, the folder rack icon having an auxiliary menu with an associated menu item for each label associated with a slot; and (e) in response to the selection of the associated menu item from the auxiliary menu for a label associated with a selected slot, opening the associated window for each object in the selected slot in the display space.

34. A computer-readable medium holding computer-executable instructions for performing a method for grouping a plurality of icons to occupy less area in a display space than a separate display for each grouped icon, each grouped icon being associated with an object, comprising:

(a) displaying a supply rack icon associated with a supply rack, said supply rack icon having a visual representation for each slot in the supply rack, each slot being able to contain one or more visual representations of a template generator, and being associated with a window, each template generator being employed to generate a new instance of an object from a template associated with each visual representation of the template generator, the supply rack icon being displayed in a fashion that occupies less area in the display space than a separate display of an icon for each template;

(b) in response to selecting the visual representation of the template generator, determining the template generator associated with the visual representation of the template generator;

(c) invoking the determined template generator to generate a new instance of the object from the template in a separate window when the visual representation of the template generator is selected;

(d) enabling a label to be created for each slot of the supply rack, each label being associated with a separate slot in the supply rack;

(e) displaying the supply rack icon associated with the supply rack, the supply rack icon having an auxiliary menu within an associated menu item for each label associated with a slot; and (f) in response to the selection of the associated menu item from the auxiliary menu for a label associated with a selected slot, opening the associated window for each object held in the selected slot in the display space.

35. The computer-readable medium of claim 34, wherein selecting the visual representation of the template generator comprises selecting the visual representation of the template Generator with an input device including a mouse.

36. The computer-readable medium of claim 34, wherein selecting the visual representation of the template generator comprises dragging the visual representation of the template generator to a position in the display space and dropping the visual representation at the position in the display space.

37. The computer-readable medium of claim 35, wherein the supply rack icon contains a word-processing template generator for venerating, a new instance of a word-processing object.

38. The computer-readable medium of claim 34, wherein the supply rack icon contains a spreadsheet template generator for generating a new instance of a spreadsheet object.

39. The computer-readable medium of claim 34, wherein the supply rack icon contains a note template generator for generating a new instance of a note object.

40. The computer-readable medium of claim 34, wherein the supply rack icon contains a mail message template generator for generating a new instance of a mail message object.

41. A computer-readable medium holding computer-executable instructions for performing a method for grouping a plurality of icons to occupy less area in a display space than a separate display for each grouped icon, each grouped icon being associated with an object, comprising:

(a) providing a predefined folder rack configuration template, said predefined folder rack configuration template having at least one predefined slot for containing one or more objects and enabling a predefined label to be separately associated with each predefined slot;

(b) associating said predefined folder rack configuration template with a predefined folder rack icon, the predefined folder rack icon including a visual element for each slot in the predefined folder rack configuration template, the predefined folder rack icon being displayed in a fashion that occupies less area in the display space than a separate display of an icon for each label associated with each slot in the predefined folder rack configuration template;

(c) when said predefined folder rack configuration templates is selected, creating a new instance of a predefined folder rack based on the selection of the predefined folder rack configuration template; and (d) enabling said predefined folder rack to be persistently locked as a unit so that all of the objects contained in each slot of the predefined folder rack are inaccessible through the predefined folder rack icon until the predefined folder rack is unlocked.

* * * * *

UNITED STATES PATENT AND TRADEMARK OFFICE
CERTIFICATE OF CORRECTION

PATENT NO.    : 6,307,547 B1
DATED         : October 23, 2001
INVENTOR(S)   : D.A. Bolnick It is certified that error appears in the above-identified patent and that said Letters Patent is hereby corrected as shown below:

Title page,
Item [56], References Cited, OTHER PUBLICATIONS, insert in appropriate order the following:
-- OTHER PUBLICATIONS
"Windowless Icon Grouping," IBM Technical Disclosure Bulletin, vol. 37, No. 0213, Feb. 1994. --

Column 2,
Line 53, "depicts example of appearance" should read -- depicts an example of the appearance --

Column 3,
Line 56, "with state" should read -- with the state --

Column 4,
Line 3, "documents and thus," should read -- documents; and thus --
Line 27, "that full implies" should read -- that "full" implies --
Line 29, "folder, specifies" should read -- folder specifies --

Column 5,
Line 50, "is complete" should read -- is completed --

Column 7,
Line 11, "the users with" should read -- the user with --
Line 48, "from a folder rack" should read -- from that of a folder rack --
Line 65, "for the note-it pad" should read -- for the note-it pad, --
Line 67, "note 126 as shown in FIG. 12C" should read -- note 126, as shown in FIG. 12C, --

Column 8,
Line 26, "further comprises" should read -- further comprising --
Lines 50-51, "further comprising" should read -- further comprising: --
Lines 50-51, and subindent the phrase "a labeling facility for labeling the slots in the supply rack with a name."

UNITED STATES PATENT AND TRADEMARK OFFICE
CERTIFICATE OF CORRECTION

PATENT NO. : 6,307,547 B1
DATED : October 23, 2001
INVENTOR(S) : D.A. Bolnick

It is certified that error appears in the above-identified patent and that said Letters Patent is hereby corrected as shown below:

<u>Column 9,</u>
Line 16, "grouped icons each" should read -- grouped icon, each --
Line 43, "having, an" should read -- having an --
Line 44, "within associated" should read -- with an associated --
Line 48, "slot opening" should read -- slot, opening --
Line 52, "venerator" should read -- generator --
Line 66, "generating, a" should read -- generating a --

<u>Column 10,</u>
Line 31, "template; ad" should read -- template; and --

<u>Column 12,</u>
Line 6, "within an associated" should read -- with an associated --
Line 16, "Generator" should read -- generator --
Line 25, "venerating, a" should read -- generating a --
Line 57, "plates is" should read -- plate is --

Signed and Sealed this

Twenty-third Day of July, 2002

Attest:

JAMES E. ROGAN
*Attesting Officer*     *Director of the United States Patent and Trademark Office*